US011734784B2

(12) United States Patent
Osman

(10) Patent No.: US 11,734,784 B2
(45) Date of Patent: Aug. 22, 2023

(54) METADATA WATERMARKING FOR 'NESTED SPECTATING'

(71) Applicant: Sony Interactive Entertainment Inc., Tokyo (JP)

(72) Inventor: Steven Osman, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 422 days.

(21) Appl. No.: 16/684,102

(22) Filed: Nov. 14, 2019

(65) Prior Publication Data

US 2021/0150657 A1    May 20, 2021

(51) Int. Cl.
*G06K 9/00*      (2022.01)
*G06T 1/00*      (2006.01)
*H04N 19/467*    (2014.01)

(52) U.S. Cl.
CPC .......... *G06T 1/0085* (2013.01); *G06T 1/0028* (2013.01); *H04N 19/467* (2014.11)

(58) Field of Classification Search
CPC ................ G06T 1/0085; G06T 1/0028; G06T 2201/0051; G06T 2201/0065; G06T 1/005; H04N 19/467
See application file for complete search history.

(56) References Cited

U.S. PATENT DOCUMENTS

| | | | | |
|---|---|---|---|---|
| 6,314,518 B1* | 11/2001 | Linnartz | ................ | H04N 5/913 |
| | | | | 713/180 |
| 6,374,036 B1* | 4/2002 | Ryan | ................... | G06T 1/0028 |
| | | | | 382/233 |
| 6,700,989 B1* | 3/2004 | Itoh | .................. | G06T 1/0085 |
| | | | | 348/460 |
| 7,945,781 B1* | 5/2011 | Rhoads | .............. | G11B 20/0021 |
| | | | | 713/176 |
| 8,320,606 B1* | 11/2012 | Moorer | ................. | G06T 1/0028 |
| | | | | 713/176 |
| 8,369,568 B2* | 2/2013 | Agaian | ................. | G06T 1/0028 |
| | | | | 382/100 |
| 9,262,794 B2* | 2/2016 | Zhao | ..................... | G06T 1/0021 |
| 9,912,986 B2* | 3/2018 | Eyer | ..................... | H04H 60/73 |
| 10,032,192 B2* | 7/2018 | Tinsman | ............ | H04N 21/4316 |
| 10,148,388 B1* | 12/2018 | Louth | .............. | H04N 21/64322 |
| 10,178,443 B2* | 1/2019 | Petrovic | ............ | H04N 21/8586 |
| 10,834,457 B1* | 11/2020 | Bourgoyne | ........ | H04N 21/4318 |
| 11,023,618 B2* | 6/2021 | Berman | ................ | G06T 1/0028 |
| 2002/0012443 A1* | 1/2002 | Rhoads | .............. | H04N 1/00973 |
| | | | | 382/100 |
| 2004/0125125 A1* | 7/2004 | Levy | ..................... | G06T 1/0085 |
| | | | | 715/716 |
| 2004/0128514 A1* | 7/2004 | Rhoads | ................... | G06F 16/40 |
| | | | | 704/E15.045 |
| 2005/0069167 A1* | 3/2005 | Zarrabizadeh | ....... | H04N 19/136 |
| | | | | 375/E7.161 |
| 2006/0107195 A1* | 5/2006 | Ramaswamy | ....... | H04N 21/443 |
| | | | | 715/730 |

(Continued)

*Primary Examiner* — Shervin K Nakhjavan
(74) *Attorney, Agent, or Firm* — John L. Rogitz

(57) ABSTRACT

A watermark representing a link to an original video and/or metadata such as haptic metadata associated with the original video is embedded in the original video in such a way that a re-recording to the original video can still preserve the watermark. The watermark can be used to link to the original video or to the metadata related thereto.

13 Claims, 7 Drawing Sheets

(56) References Cited

U.S. PATENT DOCUMENTS

| | | | | |
|---|---|---|---|---|
| 2006/0120560 A1* | 6/2006 | Davis | ................ | H04L 67/2895 707/E17.02 |
| 2008/0089552 A1* | 4/2008 | Nakamura | ........... | H04N 21/835 375/E7.009 |
| 2008/0089554 A1* | 4/2008 | Tabankin | ......... | H04N 5/232939 348/E5.042 |
| 2008/0095397 A1* | 4/2008 | Rhoads | .............. | H04N 1/32251 704/E19.009 |
| 2009/0232352 A1* | 9/2009 | Carr | ...................... | G06T 1/0064 382/100 |
| 2010/0146285 A1* | 6/2010 | Rhoads | ................... | G06F 16/41 713/176 |
| 2011/0142418 A1* | 6/2011 | He | ......................... | H04N 19/48 386/E9.011 |
| 2012/0136716 A1* | 5/2012 | Callaghan | .......... | G06Q 30/0277 705/14.69 |
| 2013/0036363 A1* | 2/2013 | Johnson | ................ | H04L 67/306 715/738 |
| 2013/0132729 A1* | 5/2013 | Arnold | ..................... | H04L 9/12 713/176 |
| 2013/0301872 A1* | 11/2013 | Flaharty | ................. | H04N 5/913 382/100 |
| 2013/0307873 A1* | 11/2013 | Blanchflower | .... | H04N 21/4355 348/231.3 |
| 2015/0086067 A1* | 3/2015 | Mehta | ................... | G06T 1/0071 382/100 |
| 2015/0242983 A1* | 8/2015 | DiGiovanni | ..... | H04N 21/43074 382/100 |
| 2016/0150297 A1* | 5/2016 | Petrovic | ........... | H04N 21/23892 725/25 |
| 2017/0118537 A1* | 4/2017 | Stransky-Heilkron | | ...................... G06F 21/16 |
| 2017/0316808 A1* | 11/2017 | Wang | ................... | G11B 27/036 |
| 2018/0025462 A1* | 1/2018 | Li | .......................... | G06T 1/0085 382/100 |
| 2019/0373339 A1* | 12/2019 | Bradley | ........... | H04N 21/44204 |
| 2021/0076104 A1* | 3/2021 | Okura | .............. | H04N 21/44008 |
| 2021/0271327 A1* | 9/2021 | Topchy | ................. | G06F 3/0416 |
| 2021/0304348 A1* | 9/2021 | Li | .......................... | G06T 1/0092 |
| 2022/0007083 A1* | 1/2022 | Lin | .................. | H04N 21/23892 |

* cited by examiner

WATERMARK (PIXEL PATTERN)

US 11,734,784 B2

METADATA WATERMARKING FOR 'NESTED SPECTATING'

FIELD

The application relates generally to technically inventive, non-routine solutions that are necessarily rooted in computer technology and that produce concrete technical improvements.

BACKGROUND

As understood herein, original videos may themselves be filmed and this process may propagate through several re-filmings. As also understood herein, such re-filming can result in the loss of interesting commentary or other contributions by what are referred to as "influencers", e.g., an interesting sports announcer, as follow-on commentary may be layered over the original. People may nonetheless wish to hear the original influencer.

Furthermore, in computer simulations such as computer games, "influencers" may be people such as experienced gamers whose play, comments, and so on influence other people concerning a game, e.g., whether to purchase or play the game. Present principles understand that an improved influencer experience may be provided to observers of the influencer.

SUMMARY

Accordingly, a system includes at least one source of video configured with executable instructions for embedding in at least one frame of original video at least one visible watermark established at least in part by a portion of the frame less than one hundred percent (100%) of the frame having pixels altered from the original video. The system also includes at least one player of video configured with executable instructions for identifying the watermark and based thereon accessing a link to the original video and/or metadata associated with the original video.

In some examples, the pixels altered from the original video are altered by shifting a brightness and/or color value of the pixels without disrupting an image shown in the frame. in other examples the pixels altered from the original video establish a quick response (QR) code. If desired, the watermark can be repeated in the frame of video in at least two respective regions of the frame.

The original video may include a computer simulation or a video of real-world activity.

In non-limiting examples, the metadata includes haptic generation metadata.

In example embodiments the receiver is configured with executable instructions for embedding in a copy of the original video a substitute watermark representing a link to the original video, ad/or metadata associated with the original video, along with metadata associated with the copy of the original video.

In another aspect, a method includes re-recording an original video, and identifying a watermark in at least one frame of the original video. The method also includes, based at least in part on the watermark, providing a link to the original video, or providing metadata associated with the original video, or providing a link to the original video and providing metadata associated with the original video.

In another aspect, a system includes at least one computer simulation controller, and at least one computer simulation source configured to receive input from the computer simulation controller to control presentation of a computer simulation presented on at least one display. The system includes at least one processor and at least one storage accessible to the processor with instructions executable by the processor to identify an influencer who is watching the computer simulation or another spectator, and based at least in part on identifying the influencer, provide to a device associated with a candidate player the computer simulation including a level of the computer simulation at a time at which the influencer is watching the simulation.

In some examples of this aspect, the instructions are executable to, based at least in part on identifying the influencer, provide to a device associated with a candidate player the computer simulation including at least one haptic event in the computer simulation at a time at which the influencer is watching the simulation.

In example implementations, the computer simulation includes at least one watermark identifying one or more of: the computer simulation, a level of the computer simulation, and haptic events in the computer simulation. The instructions may be executable to identify the watermark, and based at least in part on the watermark, provide to the device associated with the candidate player the computer simulation. The computer simulation may also include at least one metadata stream associated with video of the computer simulation, with the metadata stream identifying one or more of: the computer simulation, a level of the computer simulation, and haptic events in the computer simulation. The instructions may be executable to, based at least in part on the metadata stream, provide to the device associated with the candidate player the computer simulation.

The details of the present application, both as to its structure and operation, can best be understood in reference to the accompanying drawings, in which like reference numerals refer to like parts, and in which:

DETAILED DESCRIPTION

Figure 1:
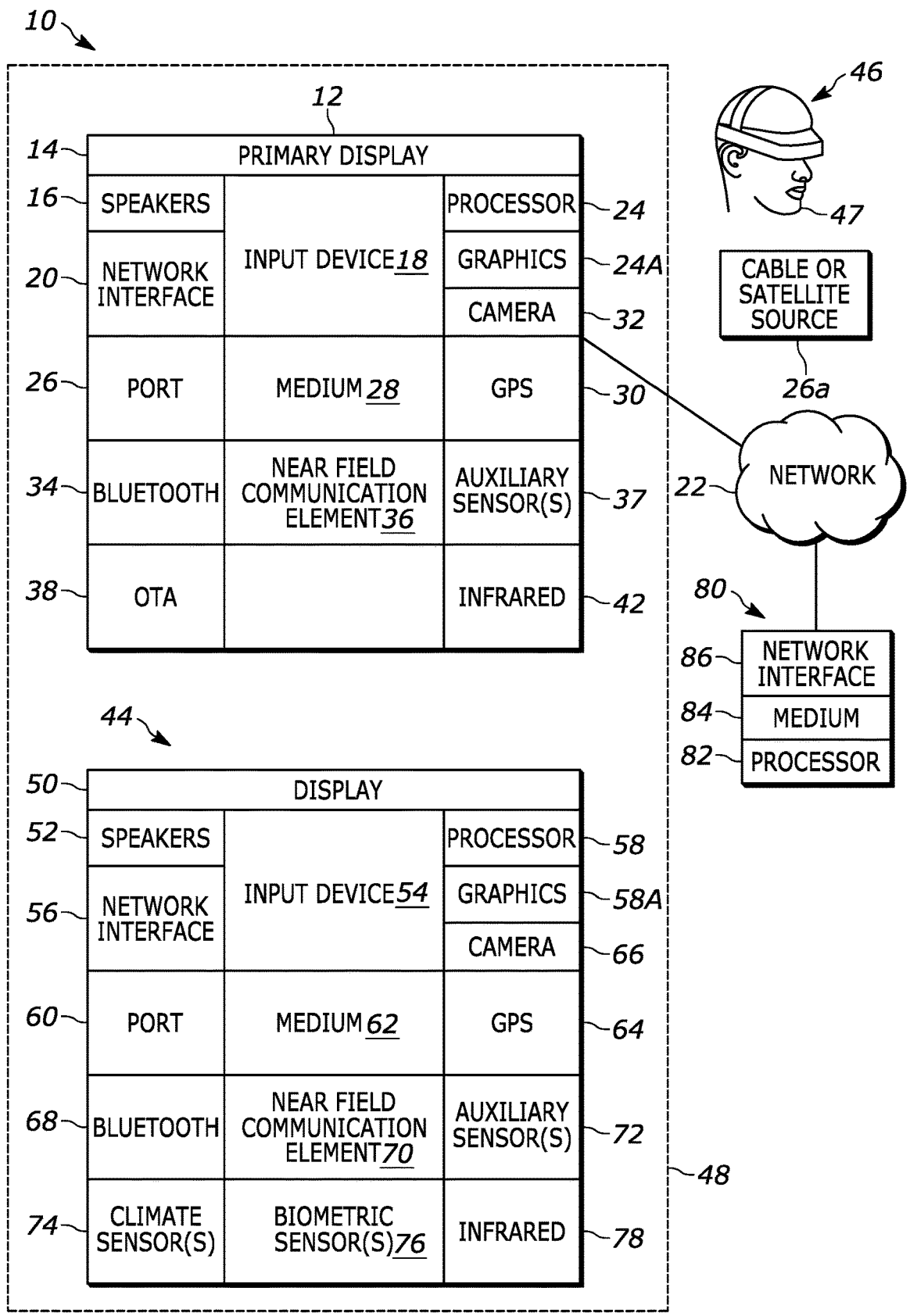
FIG. 1 is a block diagram of an example system including an example in accordance with present principles.

This disclosure relates generally to computer ecosystems including aspects of consumer electronics (CE) device networks such as but not limited to computer simulation networks such as computer game networks as well as standalone computer simulation systems. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access web sites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social web site to network members.

As used herein, instructions refer to computer-implemented steps for processing information in the system. Instructions can be implemented in software, firmware or hardware and include any type of programmed step undertaken by components of the system.

A processor may be a single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 including. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes described further below. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown. In the example shown, only two CE devices 44, 46 are shown, it being understood that fewer or greater devices may be used. For example, principles below discuss multiple players 47 with respective headsets communicating with each other during play of a computer game sourced by a game console to one or more AVD 12.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller, and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12 and/or a game console, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Now referring to FIG. 2, when an original video is made, the source of the original video, which may encompass a separate watermark-provisioning source, correlates at least one watermark to a network location or other location at which the original video subsequently may be obtained or downloaded, and if desired also correlates the watermark to metadata associated with the original video. The metadata may include information regarding what types of haptic events, including amplitude, duration, etc. are associated with particular segments of the original video. The metadata also may include additional information, including but not limited to actors and "influencers" including prominent commentators and computer gamers associated with making or narrating the original video. The metadata may also include information regarding particular locations in the original video so that, for example, if the original video is a computer simulation, a candidate player may be able to link directly into a specific temporal and/or spatial location of the simulation. Simulated 3D worlds can be large, and present principles can identify a "right" place and a "right" time.

Proceeding to block 202, the watermark is embedded in the original video. In particular, the watermark may be embedded into one or more frames of the video and indeed may be embedded in every frame of the video, or at least every I-frame of a motion picture expert group (MPEG) video.

Moving to block 204, the original video, which may be, e.g., a computer simulation or a video of a real-world event such as a movie or sporting event, is provided to receiving devices along with the embedded watermark. In some instances, the watermark may be an audio watermark provided in audio accompanying the video.

Figure 2:
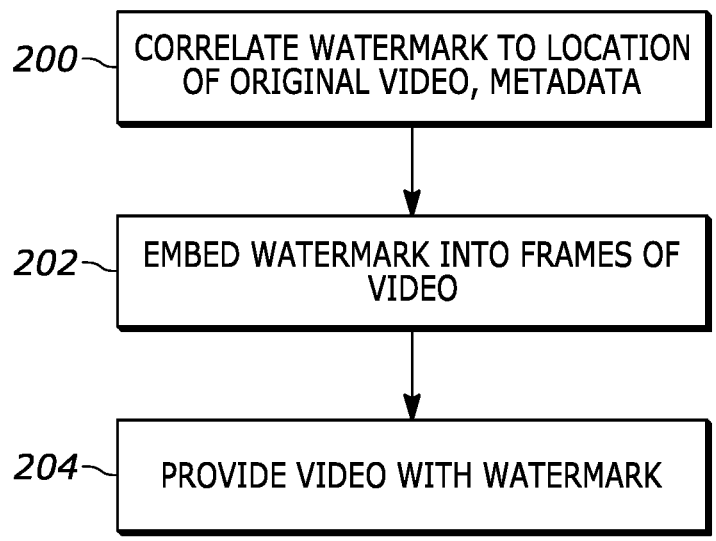
FIG. 2 is a flow chart of example logic for embedding watermarks in original video.
Figure 3:
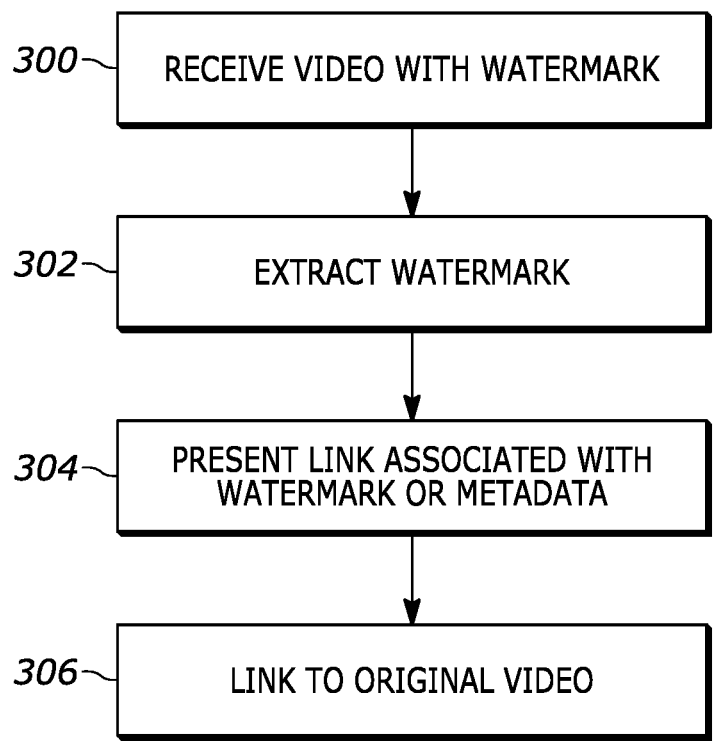
FIG. 3 is a flow chart of example logic for retrieving original video or metadata related thereto using watermarks in original video.

Moving to FIG. 3, it is to be borne in mind that the logic can be followed both when receiving the original video from FIG. 2 and when receiving a copy or re-recording of the original video that also copies or re-records the watermark in the original video. A receiver such as a video playback apparatus such as a TV or a computer simulation console receives the video with watermark at block 300. The receiver identifies the watermark at block 302.

Proceeding to block 304, the receiver may present a link associated with the original video as correlated from the watermark or from metadata accompanying the video. Should a viewer select the link, the receiver may link back to the original video at block 306 to present the original video with accompanying original audio and original haptic signals in lieu of, e.g., the audio/haptic events that may subsequently have been associated with a copy of the original video. Or, instead of requiring a viewer to select the link, the receiver may automatically link to the earlier video or higher resolution version of video along with reproducing haptics. Note that the watermarks may link to digital rights management (DRM) information, with DRM being waived if, for example, the receiver automatically links to a higher resolution version of the video, typically the original video. Note further that the watermark can include information regarding where to buy a computer game when the original video is the computer game.

Thus, watermarks are used in a first video that is preserved in a recording of the first video to link to the first video or data related thereto from the recording.

Figure 4:
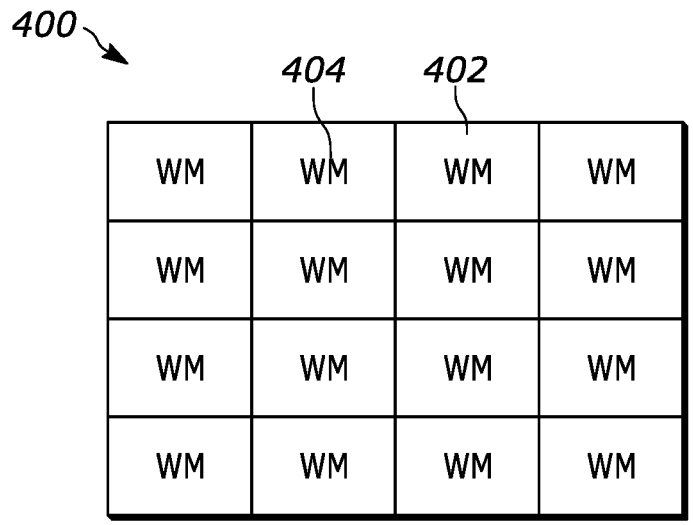
FIG. 4 schematically illustrates that the watermark may be repeated in multiple regions of a video frame.

FIG. 4 illustrates a video frame 400 with regions 402 (sixteen regions 402 shown in the non-limiting example of FIG. 4). In some or all regions 402, a respective watermark 404 may be embedded, such that a re-recording of the frame 400 that records only a portion of the frame nonetheless can be expected to record at least one complete watermark 404. Each watermark 404 may be identical to the other watermarks with the exception that each watermark can include information identifying what region 402 it is embedded in so a receiver subsequently can understand the full extent of the original image if cropping occurs during re-recording.

Figure 5:
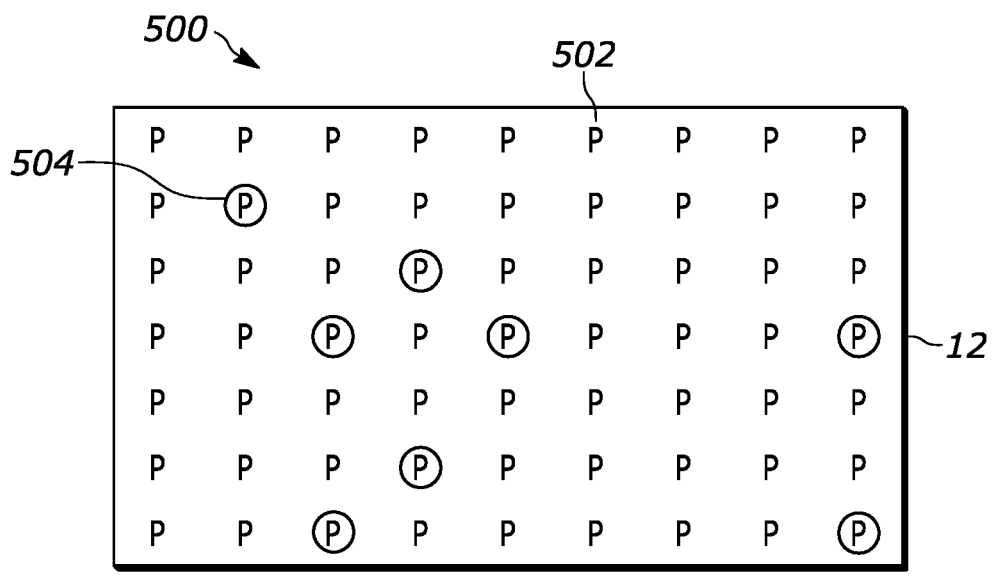
FIG. 5 illustrates a pixelated watermark that is subtly embedded in a frame.

FIG. 5 illustrates an example watermark that is subtle and essentially unobtrusive to a human viewer. In FIG. 5, a frame 500 of video is presented on a display such as the display 12 shown in FIG. 1. The image in the frame is established by an array of pixels 502 in the display. The spatial pattern of a subset of pixels 504 (shown in circles in FIG. 4) can establish the watermark. The pixels 504 in the watermark subset may be original image pixels altered slightly to have a slightly different color or brightness or other quality, so that the watermark does not disrupt the image shown in the frame to a human viewer but can be detected by the playback device. For example, the pixels 504 in the watermark subset may each be varied by three brightness units from the surrounding pixels, with this precise variance being detected either optically by a camera that may be part of a receiver or re-recording device or may be detected in the MPEG encoded information when such is available to the playback device.

Figure 6:
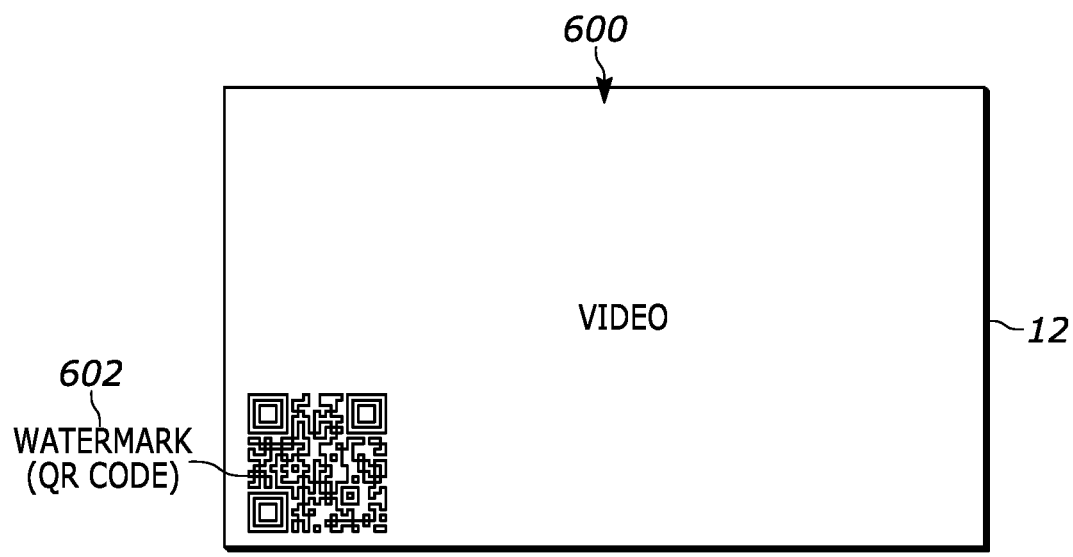
FIG. 6 illustrates a watermark embedded in a frame as a quick response (QR) code.

In contrast, FIG. 6 shows a frame 600 that has an obtrusive watermark 602, in this case a QR code. While such a code may be more disruptive than the arrangement of FIG. 5, it has the quality of being more reliably reproduced by a re-recording of the video using another camera filming the original video.

Figure 7:
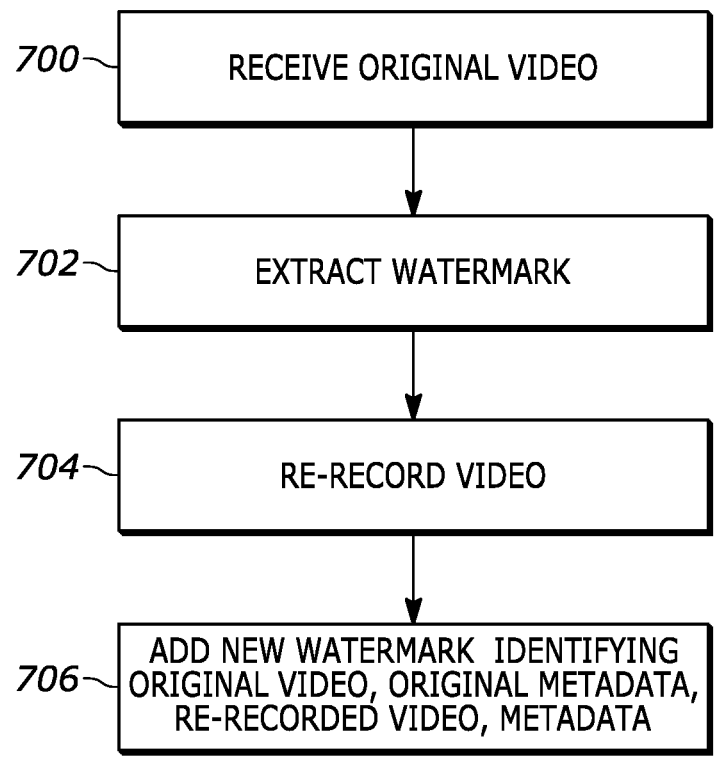
FIG. 7 is a flow chart of example logic for replacing an original watermark with an enhanced watermark in a re-recording of the video.

Now referring to FIG. 7, in the event that a mobile recording device such as a camera on a cell phone re-records a video, either an original video or a copy of an original video (ad infinitum), it may do so at an angle to the normal of the display device being recorded. In such a case the re-recording device may be programmed to transform a trapezoidal image to a rectangle to obtain the watermark. Super-resolution may be used for this purpose.

Commencing at block 700, the video to be re-recorded is received and displayed, and the watermark(s) extracted at block 702. A re-recording of the video is generated at block 704. During recording the original watermark is detected and removed, and at block 706 a new (substitute) watermark is embedded in the re-recording containing information related to both the metadata represented by the video received at block 700 plus new metadata to indicate a re-recording and additional metadata including information pertaining to any influencers associated with the re-recording at block 704, boosting the original data with new data by essentially amplifying and rewriting watermark. This way earlier watermarks are not so easily lost by low quality re-recording.

Accordingly, it may be appreciated that every time a video is re-recorded, a watermark may be embedded to point to earlier versions of the video, so watermarks are effectively layered onto successive re-recordings of the video. This recognizes that there is value not just in the original video but also in earlier re-recordings of the original video and in related links, e.g., the original commentator's web page.

Figure 8:
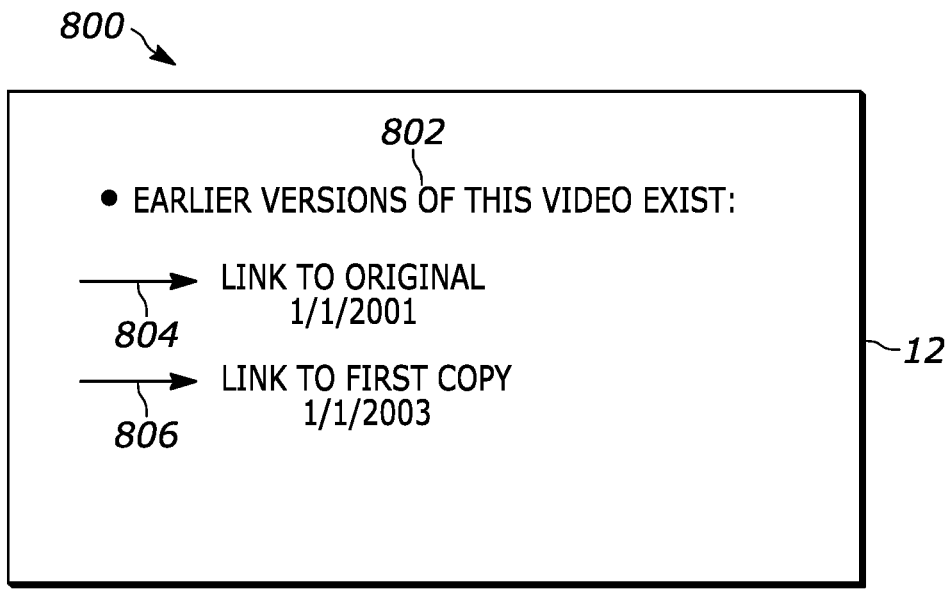
FIG. 8 is a screen shot of an example user interface (UI) to enable a viewer to retrieve a desired version of the original video.

FIG. 8 illustrates further. A receiver may present on a display a UI 800 indicating at 802 that earlier versions of a video are available. Links 804 and 806 to respective earlier recordings are provided for selection by a viewer to show the selected one of the earlier versions. Names of commentators and other influencers may be presented with the links.

Figure 9:
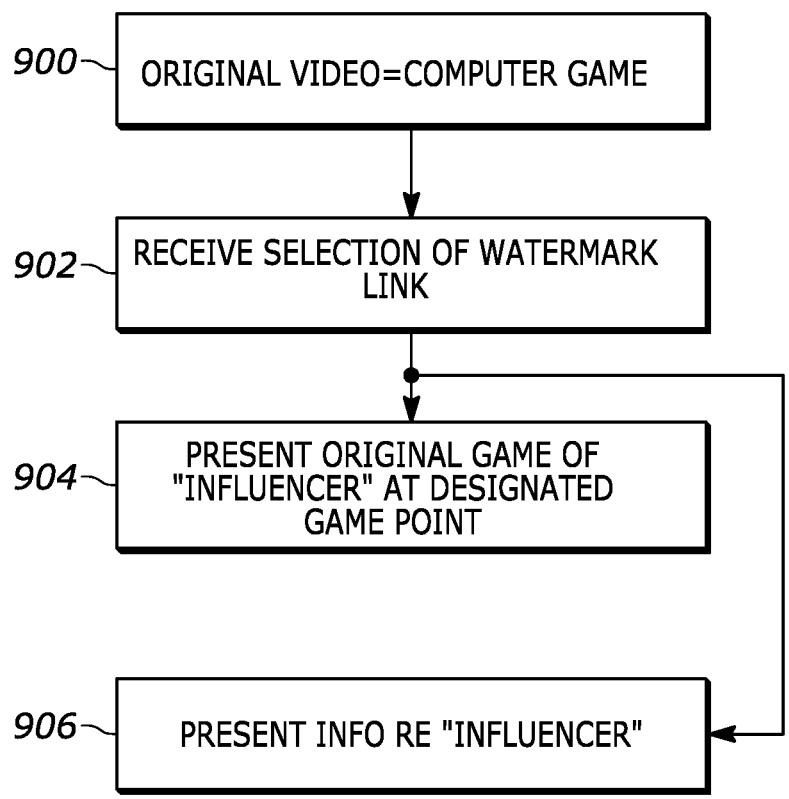
FIGS. 9-11 are flow charts of example logic pertaining to computer simulations.

FIG. 9 illustrates logic focused on a video that is a computer simulation such as a computer game as indicated at block 900. The video may be presented along with a link to an earlier recorded version which may be selected at block 902. At block 904 presentation may change to the selected earlier version of the simulation, which may be of a game played earlier by an influencer as indicated in the link, commencing at a designated point in the earlier version as indicated by the watermark. Additional information pertaining to the identity and other information of the influencer may be presented at block 906, based on links or metadata contained in the watermark.

Figure 10:
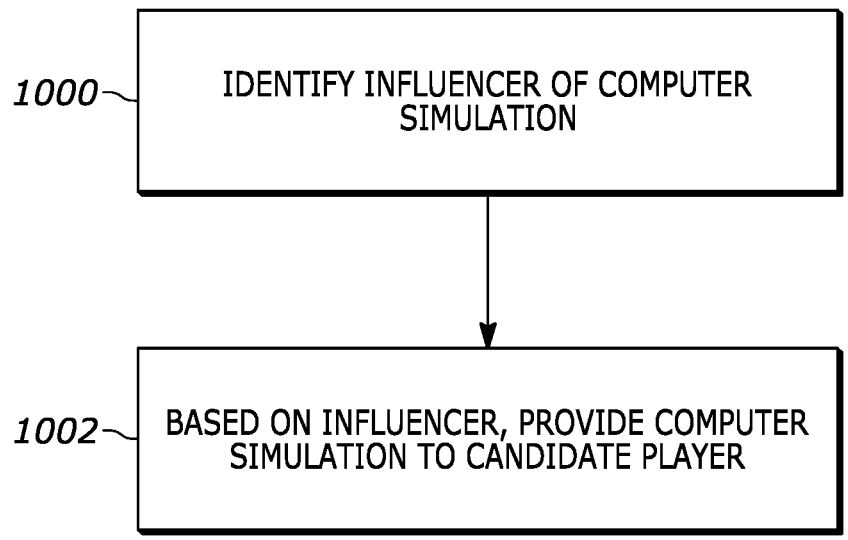
Figure 11:
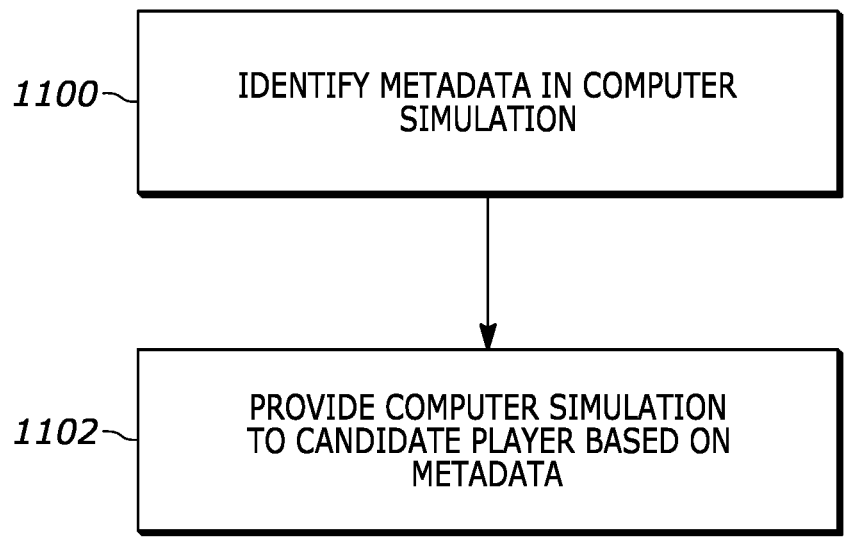

FIGS. 10 and 11 illustrate still further logic focused on computer simulations. Commencing at block 1000 in FIG. 10, an influencer or other spectator who is watching a computer simulation being presented and/or recorded is identified, e.g., using image or voice recognition or text input. At block 1002, based at least in part on identifying the influencer, the computer simulation, including the level of the computer simulation at the time at which the influencer is watching or playing the simulation, is provided to a device associated with a candidate player, so that the candidate player can view the simulation from the point of view of the influencer. Accompanying audio and haptics also may be provided as indicated in the original simulation.

To this end, the computer simulation may include one or more watermarks identifying one or more of the computer simulations, the level of the computer simulation, and haptic events in the computer simulation. As discussed previously, the watermark is identified and based on the watermark, the computer simulation is provided to the device associated with the candidate player.

FIG. 11 illustrates at block 1100 that the computer simulation can include a metadata stream associated with video of the computer simulation. The metadata stream identifies one or more of the computer simulations, a level of the computer simulation, and haptic events in the computer simulation. As indicated at block 1102, based on the metadata stream, the computer simulation with associated events and audio is provided to the device associated with the candidate player.

Figure 12:
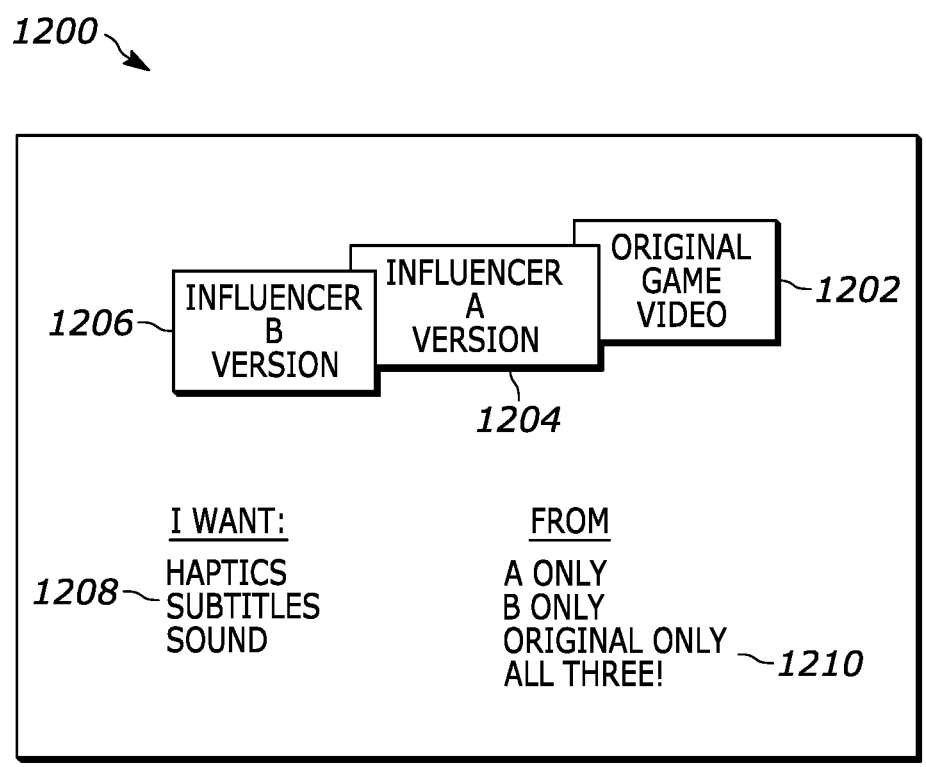
FIG. 12 is a UI consistent with present principles.

Now referring to FIG. 12, a UI 200 may be presented on any display divulged herein which assumes for disclosure purposes that an original computer game video, i.e., a video of play of a computer game, has been successively altered by a first influencer ("influencer A") to render a first altered version of the video and then a second influencer ("influencer B") to render a second altered version of the video, with each version being associated with its own version of the above-described metadata including information on things such as haptics, subtitles, and sound.

Respective thumbnail still or video images 1202, 1204, 1206 of the three versions may be presented. Also, selectors 1208 derived from the metadata may be presented to allow the end viewer to select which of the non-game video components accompanying each stream the viewer wishes to experience. In the example shown, assume the system of FIG. 12 has the capability to present, in addition to video, both sound and haptic information. Selectors 1210 may be presented to enable a viewer to select which one of the versions of the game play he wishes to view. In the example shown, the viewer may be enabled to select to view all three versions in respective windows on the display.

Thus, a system is disclosed that allows nesting of videos each with metadata associated with it, indicating, for example, links to the original video, haptic data, etc. Thus, a playback device not only allows the viewer to link back to original content, a user interface may also be provided to allow a viewer to navigate across different layers of a video. For instance, if a stream of a computer game that has haptics is being presented, and the stream source has additional haptics, and on top of that there's a re-stream with additional haptics as well, three layers of haptics for the same underlying video event are available. The end viewer may be presented with an option to experience all three layers of haptic events combined, or focus in on one layer's haptics to the exclusion of the others. The same principle applies to multiple layers of sound, subtitles, or anything else that may be associated with serial retransmissions of the same underlying video event.

It will be appreciated that whilst present principals have been described with reference to some example embodiments, these are not intended to be limiting, and that various alternative arrangements may be used to implement the subject matter claimed herein.

What is claimed is:

1. A system comprising:
    at least one source of video, the source of video configured with executable instructions for embedding in at least one frame of original video at least one visible watermark established at least in part by a portion of the frame less than one hundred percent (100%) of the frame having pixels altered from the original video; and
    at least one player of video configured with executable instructions to:
    the watermark and based thereon access a link to the original video; and
    embed, responsive to re-recording a first video, a watermark to point to at least two network locations at which respective earlier versions of the first video can be accessed.

2. The system of claim 1, wherein the pixels altered from the original video are altered by shifting a brightness and/or color value of the pixels without disrupting an image shown in the frame.

3. The system of claim 1, wherein the pixels altered from the original video establish a quick response (QR) code.

4. The system of claim 1, wherein the watermark is repeated in the frame of video in at least two respective regions of the frame.

5. The system of claim 1, wherein the original video comprises a computer simulation.

6. The system of claim 1, wherein the original video comprises a video of real-world activity.

7. The system of claim 1, wherein the at least one player of video is configured with executable instructions for identifying the watermark and based thereon accessing metadata which comprises haptic generation metadata.

8. The system of claim 1, wherein the player of video is configured with executable instructions for embedding in a copy of the original video a substitute watermark representing a link to the original video, or metadata associated with the original video, along with metadata associated with the copy of the original video.

9. The system of claim 8, wherein the player of video is configured with executable instructions for embedding in a copy of the original video a substitute watermark representing a link to the original video along with metadata associated with the copy of the original video.

10. The system of claim 8, wherein the player of video is configured with executable instructions for embedding in a copy of the original video a substitute watermark representing metadata associated with the original video along with metadata associated with the copy of the original video.

11. The system of claim 1, wherein the watermark indicates a re-recording of the original video.

12. The system of claim 1, wherein the watermark indicates information pertaining to at least one influencer associated with a re-recording of the original video.

13. A system comprising:
    at least one source of video, the source of video configured with executable instructions for embedding in at least one frame of a first video at least one watermark; and
    at least one player of video configured with executable instructions to:
    re-record the first video to render a re-recording of the first video; and
    embed in the re-recording the first video a watermark to point to at least two network locations at which respective earlier versions of the first video can be accessed.

* * * * *